United States Patent Office 3,383,658
Patented May 14, 1968

3,383,658
CENTRAL TO REMOTE SIGNALLING SYSTEM HAVING COUNTER CONTROLLED INFORMATION TRANSMISSION
John David Martin, David John Norton, Edgar Ian White, and William Ernest New, London, England, assignors to Westinghouse Brake and Signal Company, Limited, London, England
Filed Mar. 9, 1964, Ser. No. 350,484
Claims priority, application Great Britain, Mar. 12, 1963, 9,719/63
15 Claims. (Cl. 340—163)

ABSTRACT OF THE DISCLOSURE

An information scanning transmission system wherein a station which transmits and receives information is provided with a "short" counting chain capable of being successively stepped to unique conditions to scan successive items of information for transmission, the counting chain being "short" in that the number of possible counting steps therein is fewer than the number of items of information to be scanned for transmission. A selector circuit connects the counting chain to successive banks of transmission gates to gate items of information corresponding to that received from remote locations. A second "short" conuting chain is also provided to enable interlace of operation whereby virtually continuous transmission to and from the station is achieved, one counting chain transmitting while the other is receiving and vice-versa.

This invention relates to information scanning transmission systems and relates especially to systems of the type in which items of information at one location are scanned cyclicly for transmission to one or more other locations.

According to one aspect of the invention there is provided an information scanning transmission system including at one location counting means capable of being successively stepped to unique stepping conditions to scan successive items of information for transmission, the total number of counting steps of the counting means being small compared with the number of items of information to be scanned for transmission, a selector circuit, the selector circuit having means for rendering the counting means operable in response to stepping signals to gate, over a scan, successive items of information for transmission to a plurality of further locations each further location having further counting means also responsive to stepping signals to operate in step with the first counting means to gate items of information received in said scan to appropriate registers and also having conditioning means responsive to the recognition of a received scan of items of information pertaining to the further location for initiating a scan of items of information to be transmitted to the one location, registers at the one location, and the selector circuit having means for rendering the counting means at the one location operable in the next scan to gate items of information received from one said further location to appropriate ones of the registers, the counting means at the one location thereby being operable in alternate scans to gate successive groups of items of information for transmission and in intervening scans to gate successive groups of items of information on reception to appropriate registers.

Figure 1:
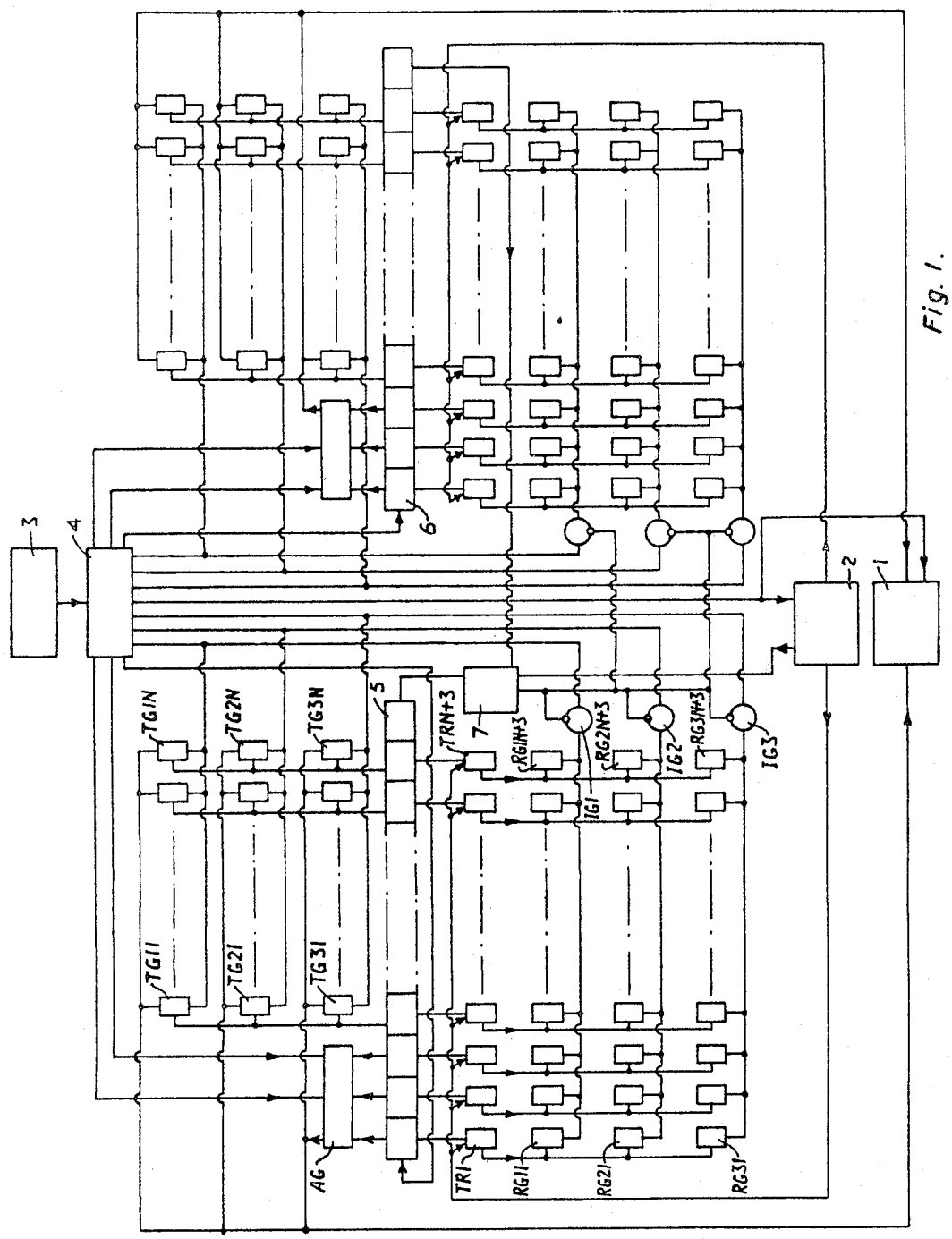
Figure 2:
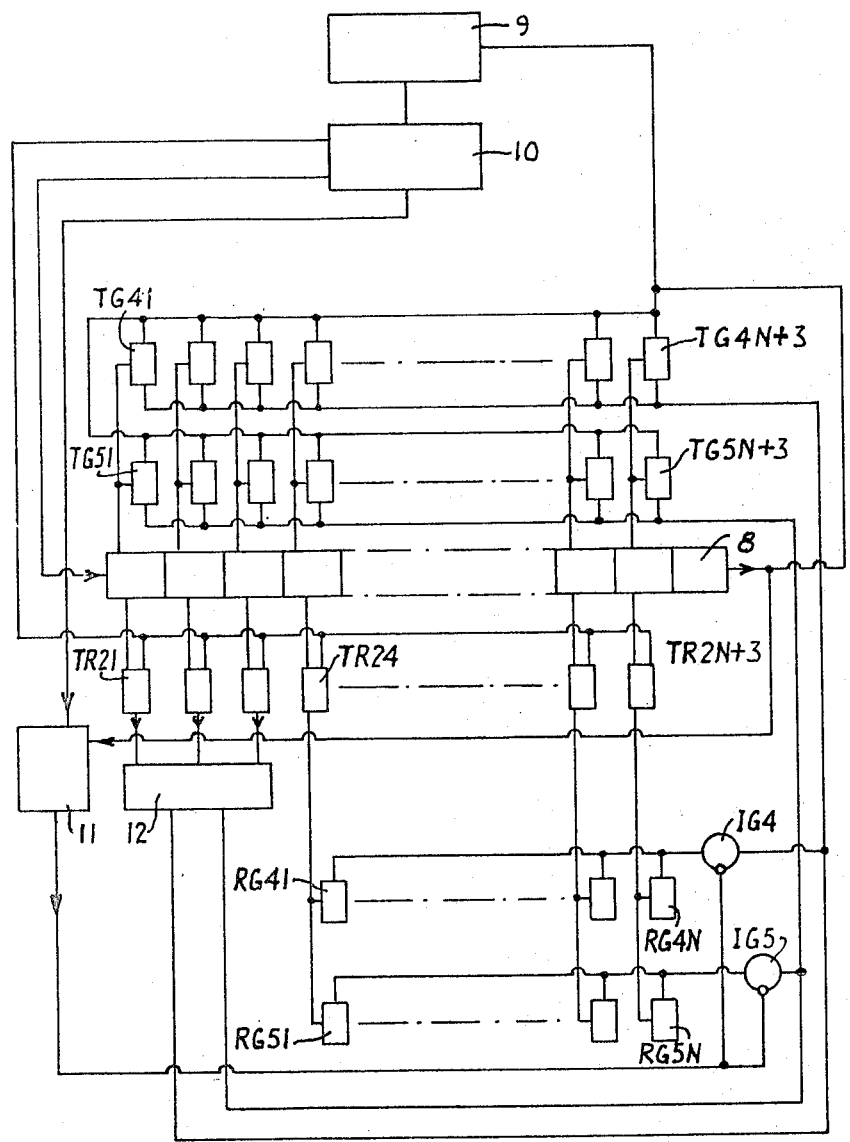

In order that the invention may be clearly understood and readily carried into effect the same will be further described by way of example only with reference to the accompanying drawings in which:

FIGURE 1 illustrates in diagrammatical form the relevant parts of a control station in a system according to one example of the invention, and FIGURE 2 illustrates in a diagrammatical form the relevant parts of a field station in a system according to one example of the invention, being suitable for operation in conjunction with the control station illustrated in FIGURE 1.

The system about to be described is a continuously scanning remote control and/or indication system of a type in which the controls and indications at one location are scanned in response to the stepping of a counting chain at the one location to transmit controls or indications to a number of remotely positioned further locations. The one location will be referred to herein as the control station and the remaining locations will be referred to as field stations. It will be understood moreover that further counting chains are provided at the field stations which enable scanning to be performed thereat in step with scanning performed at the control station. Furthermore it will be understood that in the present example of the invention the items of control or indication information consist of information of one type or another, that is the sort of information which can be conveyed by or stored in a two-state device. Hence the control information may be for example set up by hand on a plurality of two position switches at the control office or the field stations and the indications may be stored in registers comprising banks of two-state devices at either the control station or the field stations or both.

In the system about to be described the number of indications and controls is much greater than the length of the counting chain which is used to scan the items of information either for control or indication purposes. Hence the counting chains at the control station are used more than once in each complete scanning cycle to perform the scanning of all the items of information to be transmitted or received. In this system moreover groups of items of control or indication information at the control station are associated with particular field stations, that is the groups are not subdivided between field stations. It will be appreciated however that one field station may have associated with it more than one group.

In FIGURES 1 and 2 neither the indications nor controls are in fact themselves actually shown and for the sake of simplicity only the gates which are used to select the various items of information relating to controls or indications are shown.

Again, the mode of transmission of information between the various stations is assumed to be over a line wires by means of frequencies operated on a frequency shift basis such as described in our copending U.S. patent application Ser. No. 350,445, thereby providing an economy of signal channels. Further, the lines linking the various stations are not shown in the drawings.

Alternatively, communication may be by means of a radio link, although slight modification to the system is necessary to permit simplex working as opposed to duplex working assumed herein. When the control station transmits, the field stations are driven from received stepping pulses and on the next scan, the addressed field station replies, the field station is driven from a local stepping generator, and transmits stepping pulses to drive the control station.

Referring to FIGURE 1, the control station is provided with a frequency-shift transmitter 1 and a frequency-shift receiver 2 and also provided are a master pulse generator 3 and a selector circuit 4, the function of which will be described in greater detail. The control office is centered moreover on two counting chains 5 and 6 which are short as compared to the number of items of information to be scanned thereby and associated with each of these are various banks of gates and temporary registers. For the sake of simplicity moreover only the components associated with the counting chain 5 will be referred to in any detail since those associated with 6 are exactly the same. For the purpose of transmitting items of control information there are provided associated with the counting chain 5 three banks of transmission gates, the first comprising gates TG11 to TG1N, the second comprising gates TG21 to TG2N and the third comprising gates TG31 to TG3N. It will be observed that these gates are shown above the counting chain 5 and are associated with the 4th to the $(n+3)$th stages of the counting chain. Associated with the first three stages of the counting chain is a group of address gates represented by the block AG in the drawings. The outputs derived from these address gates are indicative of the field station or the group of stores within a given field station to which items of information derived from the selected group of gates at the control station, are directed. The address moreover is determined by the controls derived from the selector circuit 4.

Associated with the receiver 2 and the counting chain 5 there is provided a bank of temporary registers represented in the drawing by register stages TR1 to TRN+3 and it will be noted that there is accommodation for more received information than there is for information being transmitted representing indications. This will almost certainly usually be required and the remaining counting chain stages can as indicated in the foregoing be employed for the purposes of transmission of address information. Output leads from the various temporary register stages just referred to are connected to associated banks of registry gates. The first bank comprises gates RG11 to RK1N+3, the second bank of registry gates comprises gates RG21 to RG2N+3 and the third bank of registry gates comprises gates RG31 to RG3N+3. Each of these banks of gates is provided with a delivery wire which receives delivery signals from the selector circuit 4, respective inhibit gates 1G1, 1G2 and 1G3 being provided to inhibit the operation of the registry gates in the event of one or more checks performed by a check circuit 7, not being satisfactory.

It will be understood that the transmission gates referred to in the foregoing are operative in response to a signal from the selector circuit and a signal from the appropriate stage of the counting chain 5 to connect indication information to the transmitter 1. Further only one such transmission gate is operated at a time. In regard to the registry gates, these operate in groups, that is group RG1, RG2 or RG3 in response to a delivery signal received from the selector circuit 4 to transmit information held temporarily in the bank of temporary register stages to corresponding banks of final registry stages which are not shown in the drawing. The temporary registry stages are themselves operated one at a time in response to signals derived from the receiver 2 and from the counting chain 5.

The various transmission gates, temporary registry stages and registry gates associated with the counting chain 6 are exactly similar to those described with reference to the counting chain 5 and they operate in the same fashion.

Referring now to FIGURE 2, this as aforementioned, shows only one field station suitable for use in conjunction with the control station shown in FIGURE 1 but it will be understood that many more field stations may be provided each associated with the one control station. The field station shown in FIGURE 2 includes a counting chain represented by reference 8 which has the same number of stages as the counting chains shown in FIGURE 1. Associated with each stage of the counting chain 8 there is provided a gate in each of two groups of transmission gates for indication information to be transmitted from the field station back to the control station. One group of transmission gates comprises gates TG41 to TG4N+3 and the other group of transmission gates comprises gates TG51 to TG5N+3. These are all connected as shown to the transmitter represented by the block reference 9 the frequency band of which is different from the transmitter at the control station but the same for all other field stations.

For the purpose of reception at the field station, the latter is provided with a carrier receiver 10 which is responsive to transmissions from the control station. One output of the receiver provides timing pulses which are fed to the counting chain 8 as setting signals and another output of the receiver is connected to a bank of temporary register stages comprising stages TR21 to TR2N+3 and another output of the receiver is connected to the check circuit represented by block 11 to provide a signal thereat corresponding to the end of each scan of the counting chain. Associated moreover with the temporary register stages TR21 to TR2N+3 there are provided individual registry gates divided into groups the first of which comprises gates RG41 to RG4N and the second of which comprises gates RG51 to RG5N. The first three temporary register stages at the field station have their outputs connected to an address decoder represented by block 12, which is responsive to the information sent from the control office to (if it is relevant to the field station concerned), direct the received information to the appropriate group of final registry stages. Again, the delivery leads which in this case are connected to the address de-coder are provided with inhibit gates IG4 and IG5 as shown which inhibit the application of delivery signals to the final registry gates if the check circuit 11 performs a check which is found to be unsatisfactory. It will be observed moreover that the outputs form the address de-coder are also connected to the above mentioned groups of transmission gates. In this way the field station has build into it information as regards whether any, and if so, which, group of items of indication information are to be transmitted over scans performed by the counting chain 8. For the purpose of transmission of information from the field station, transmission gates TG4 and TG5 are provided similar to those at the control station, associated with a frequency shift transmitter 9, the frequency band of which is different from the transmitter at the control station but the same as for other field stations.

In operation of the system as a whole, the master pulse generator consists basically of a multivibrator circuit which produces a substantially symmetrical rectangular waveform, a differentiating and shaping circuit arrangement being provided to produce so-called stepping pulses for the counting chains in response to positive going transients in the multivibrator output. In addition, the multivibrator output operates as a gating control to, for the more negative half cycles of the multivibrator to condition the transmitter to transmit a centre frequency $f1$ and for the more positive half cycles of the output of the multivibrator to condition the transmitter to transmit a frequency shifted to one side or the other of the centre frequency, according to the item of information to be transmitted in the respective step of the scan. One form of frequency shift transmitter suitable for this purpose is described in the specification of the aforementioned copending application Ser. No. 350,445 and forms no part of the present invention.

To achieve the above therefore, the selector circuit 4 applies the stepping pulses derived from the above mentioned multivibrator to the counting chain 5 at the control station and applies the square wave output of the multivibrator to a selected group of transmission gates prefixed TG1, TG2 or TG3. This is assuming that initially, counting chain 5 is to operate to transmit items of information. At the same time, the selector circuit 4 provides signals on the two lines which are connected to the address gate circuit AG. These signals are derived from a counter which is provided in the selector circuit 4 and supplies to the address gate circuit such signals as will cause information which identifies a group of gates in a field station to which items of information corresponding to the selected transmission gates are to be transmitted.

In response to the applied stepping pulses the counting chain which consists of successive interconnected stages of two state circuits have their successive stages changed in state and thereby apply pulses to the respective transmission gates. The latter are thereby conditioned to cause the transmitter to transmit during the respective second half cycle of each cycle of the multivibrator a frequency which corresponds to the respective items of information. In this case the frequency will be $f2$ or $f3$ lying to either side of the centre frequency $f1$ already mentioned. By virtue of the arrangement of the address gates and the control information transmission gates, the first three steps of the counting chain 5 made in response to stepping pulses provide for the transmission of the address information which is received by all field stations. The remaining stages of the counting chain (except the last stage which indicates the end of scan) produce pulses which are fed to the transmission gates which correspond to the respective stages and the items of control information are therefore scanned one by one until the end of the particular group, which is being selected, is reached.

During the operation of the counting chain 5 of the control stations as described above, the receiver 2 at the control station is receiving stepping information interleaved with indication information from a field station address previously addressed by the control station. This being so, the counting chain 6 is fed with stepping pulses derived from this information and corresponding to transitions from the centre frequency of the field station transmitter to either side frequency. The counting chain 6 therefore conditions the associated temporary register gates to store the corresponding items of information. It will be noted moreover that since no address has to be received at the control station, three more items of information representing indications can be received than the number of items of control information transmitted in each scan of the counting chains. At the end of the scan by the counting chain 6 moreover an end-of-scan pulse is produced by the final stage of the chain which is fed to the check circuit 7 and if this so corresponds, with an end-of-scan pulse received at the receiver 2 and also fed to the check circuit 7, then the counting chains have remained in step at field and control stations, the inhibit is removed from the appropriate inhibit gates and the information stored in the temporary registers is allowed to be transferred to which ever of the final registers associated with counting chain 6 as is selected by virtue of the signal applied from the selector 4. This transfer of information normally extends into the next scanning period.

During the scan by counting chain 5, previous to the one just referred to moreover, it will be understood that information items will have normally been received on different frequencies from a field station and held in temporary register TR1 to TRN+3 at the control station. Assuming thus that satisfactory checks of synchronism have been proved by 7, during the scan just described of counting chain 5, delivery of these items of information will have taken place into the appropriate final registries via RG1, RG2 or RG3 as selected by selector 4 according to the previously selected field station address. It will be seen from this therefore that whilst one counting chain is scanning to receive the other counting chain is scanning to transmit and at the same time information temporarily stored thereby in the previous scan is delivered into its final registers.

Considering the operation of the field station, it will first be understood that each field station in general receives all information transmitted from the control station although where a field station has only one counting chain, it will also be understood that it cannot receive on two consecutive scans of the control station so it is arranged that no such station is addressed in two successive scans. As will be appreciated from the foregoing, information is in the present system received as alternate bursts of a frequency $f2$ or $f3$ which lie to either side of the centre frequency $f1$ of intervening bursts. Stepping of the counting chain at the field station is thus achieved by stepping pulses produced on detection of a transition of the received frequency from $f1$ to $f2$ or $f3$. The received bursts of $f2$ or $f3$ are transposed in a discriminator and decoding circuit moreover into control waveforms which are applied to the temporary register gates such as TR21 to TR2N+3 at the field station.

The counting chain 8 therefore of FIGURE 2 receives stepping pulses from the receiver 10 and is stepped successively to produce outputs which condition the temporary register gates TR21 to TR2N+3 to respond to the received information waveforms. The first three items, as will be recalled, correspond at the field stations to address information and the remaining items correspond to items of information in the nature of controls, from the control office. Hence at the end of the scan of the counting chain 8, the stages TR21, TR22 and so on to TR2N+3, have stored information and that stored by TR21, TR22 and TR23 is immediately available to the address de-coder 12 which, if it recognises the address code as a code which corresponds to one of the groups of registers at the field station, produces an output signal which conditions whichever of the groups of registry gates RG4 or RG5 is appropriate to the information received. This conditioning however, similarly to the state of affairs in the control office, is conditional itself upon an inhibit being removed from the line by the check circuit 11. This inhibit is removed in normal circumstances when the end of scan pulse derived from the final stage of the counting chain 8 corresponds with a received end of scan pulse derived from the receiver and which is transmitted from the control station. Hence the items of information stored in TR24 to TRN+3 are then transferred to the appropriate group of final registry stages in the appropriate field station.

Since the transfer of information from the temporary registers in the control office and in the field stations is liable if relays are employed, to take a time comparable with the time taken to scan through one operation of a counting chain, it is not possible to immediately begin a further receiving scan by the same counting chain, since by so doing there would be a danger of destroying information in the temporary registers concerned before the existing information had been transferred to the appropriate final registry stages. This is why as mentioned above the two counting chains are employed for alternate receiving scans. At the field stations however, there are generally only single counting chains so any one such field station must not receive two consecutive scans from the control station. In a similar manner to that employed with any one counting chain at the control station however, a field station counting chain can operate to transmit items of information during a scan following a receiving scan which it recognizes by its address decoder 12 as directed to itself. This transmission takes place via whichever group of transmission gates TG4 or TG5 as corresponds to the received address. Whilst such transmission is taking place, the previously received control items of information held in temporary registers TR24 to TR2N+3 are transferred to the appropriate final group of registries via gate RG4 or RG5. Although not shown in the arrangement of FIGURE 2, moreover this field station, having only one counting chain, is arranged for the reason given above to inhibit the application of received information to its temporary register stages for a single scan of the counting chain 8, following identification of one of its own addresses by the address de-coder 12.

Although not described herein, the check circuits referred to may not merely be effective to inhibit the transfer of information from temporary register stages to final register stages. The check circuit may be employed to cause, in the event of loss of synchronism between the control station counting chain and the field station counting chain, a repetition scan of the group of items of information concerned, the scan only being rejected completely and an alarm signal being produced when a given number, say three, of unsuccessful scans have been made.

Further, although in the foregoing "synchronism" presupposes that the counting chains at the control station and the field stations may be in step, this is not truly so when the lines between the stations are long as delays are present. Such delays are however substantially constant for stepping and information signals at a field station and are therefore of no consequence since in all cases the receiving chain is driven by the transmitting station.

In the foregoing description of one system employing the invention, it is assumed that each field station is provided with only one counting chain. This may ordinarily be so but if it is desireable for a field station to be able to be called by two successive addresses from the control station it may be provided with two counting chains in similar arrangement to that provided at the control station. As is pointed out moreover in the foregoing, the fact of a given field station group being addressed, in one scan of a group at the control station, is sufficient information at the control station for the appropriate gates to be operated in the next scan for the received information which comes from the same field station to be applied to the appropriate registry stages for indication purposes.

Although in the foregoing description, the counting chains at the control station are operable alternately for transmission thereby avoiding delays in scanning due to the time taken for delivery of received items of information at the control station, it may readily be arranged, by providing duplicate selector circuits, that in the event of a break-down in one of the counting chains, the system may continue to operate at reduced overall scanning speed using only the counting chain which is not broken down. This is also true of counting chains at field stations if duplicated although certain restrictions may be placed upon the sequencing of operations.

It will be recalled that the selector circuit 4 has not been described in detail in the foregoing this is because such a circuit may be readily provided by a person skilled in the art. The selector circuit may however preferably take the form of a binary counter operative in response to stepping pusles from the master generator 3 to provide output signals at predetermined values of the count to control the associated groups of gates to operate at appropriate instants during scanning by the counting chains of the items of information. Ordinarily moreover, the system is envisaged as providing a continuous cyclic scan of all items of information but it will be clear that the scanning sequence may be interrupted or only part of it performed at any one time merely by modifying the operation of the selector circuit 4, either automatically in response to some conditions of the system being supervised by the invention or merely by manual control.

In certain applications of a scanning transmission system of the type described herein, it may be desirable for transmitted indications from one field station to be made available at another field station. In order to achieve this, at the respective field station which is to receive information from another field station, there is provided a second receiver and an associated frequency discriminator circuit tuned to receive the field station frequencies. In addition, moreover an additional group of receiving registry circuits is provided in this field station and the field station which this station is to "listen" to must have a respective group of transmission gates addressed by the control station in the preceding scan of the counting chain thereat.

Again, where the fiield stations are to transmit representations of such functions as pressures or liquid levels, groups of items of information can be taken as binary digits in a digital representation of an analogue of a magnitude. To achieve this, a field station can itself operate as an analogue to digital converter of the type in which successive comparisons of the analogue quantity is compared with standards in succession to set up the digital output. This is performed by employing the field station counting chain to initiate each successive comparison and to apply the appropriate inputs the encoding circuits to cause the transmitter to apply the appropriaate frequency to the interstation line to represent a "1" or a "0" as the case may be. Since analogue to digital conversion of this form is well known, this aspect is not described further herein.

Although furthermore, the example of the invention described above employs a frequency-shift carrier transmission system, other forms of transmission system may be employed, such for example as one where discrete separate frequencies are used with respective channels for transmission and reception. Further instead of transmission by line wires, a radio link may be provided.

Having thus described our invention what we claim is:

1. An information scanning transmission system including at a first location counting means capable of being successively stepped to unique stepping conditions to scan storage devices containing items of information for transmission, the total number of counting steps of the counting means being small compared with the number of items of information to be scanned for transmission, a selector circuit, the selector circuit having means for rendering the counting means operable in response to stepping signals to gate, over a scan, successive items of information for transmission to a plurality of further locations each further location having further counting means also responsive to stepping signals to operate in step with the first counting means to gate items of information received in said scan to appropriate registers and also having conditioning means responsive to the recognition of a received scan of items of information pertaining to the further location for initiating a scan of items of information to be transmitted to the first location, registers at the one location, and the selector circuit having means for rendering the counting means at the first location operable in the next scan to gate items of information received from one said further location to appropriate ones of the registers, the counting means at the first location comprising at least one counter operable in alternate scans to gate successive groups of items of information for transmission and in intervening scans to gate successive groups of items of information on reception to appropriaate registers.

2. An information scanning transmission system as claimed in claim 1, including at each location checking means for checking synchronism of said counting means on receiving said items of received information, with scanning at a location from which the received information is transmitted and means responsive to said checking means for initiating transfer of the items of received information to final storage means.

3. An information transmission system as claimed in claim 2, further counting means being provided and said selector circuit means being operative to cause items of information to be connected for scanning for transmission by said further counting means in said intervening scanning periods and to cause application of groups of items of received information to respective temporary storage means in said alternate scanning periods, said checking means being operable to check synchronism of said further counting means on receiving items of received information with scanning at a location from which the received information is transmitted and means responsive to said checking means for initiating transfer of this information to final storage means.

4. An information transmission system as claimed in claim 1, the counting means comprising a single chain of two state devices switchable from one state to the other successively on application of stepping signals thereto.

5. An information transmission system as claimed in claim 1, the groups of items of information which are connected for scanning in the respective scanning period for transmission from at least one of said further locations including items in the form of an address indicative of a group of indications or controls at said at least one of said further locations to which they pertain and wherein response of said at least one of said further locations to a group of items of information is conditional on recognition of the address thereby.

6. An information transmission system as claimed in claim 5, the at least one of said further locations also including counting means responsive to received stepping signals to apply received items of information to appropriate respective temporary storage means thereat, the total count of the counting means being equal to that of each counting means at the first location.

7. An information transmission system as claimed in claim 6, the counting means at each further location comprising a respective chain of two state devices switchable from one state to the other successively on application of stopping signals thereto.

8. An information transmission system as claimed in claim 7, the at least one of said further locations being conditioned to receive all groups of items of information transmitted from said first location except a group immediately following a group pertaining to its own address.

9. An information transmission system as claimed in claim 8 wherein the at least one of said further locations is conditioned on recognition of one of its own addresses, to, in the next scanning period, cause its counting means to scan corresponding items of information for transmission to said one location.

10. An information transmission system as claimed in claim 9, said at least one of said further locations being conditioned on transmission of one address in one scan period to utilise items of information received in the next scan period in accordance with that address.

11. An information transmission system as claimed in claim 1, different frequency bands being provided for transmission to and transmission from said first location.

12. An information transmission system as claimed in claim 11, including at least two said further locations, one of said further locations being responsive to an address received during one scan period from said first location to cause transmission in a following scan period of items of information on a frequency band to which at least one of said further locations is responsive.

13. An information transmission system as claimed in claim 7, the counting chain at the at least one of said further locations being included in an analogue to digital conversion arrangement whereby a group or part of a group of items of information for transmission therefrom can constitute a binary coded representation of an applied analogue signal.

14. An information transmission system as claimed in claim 1 wherein the counting means at said first location comprises two chains of two state devices switchable from one state to the other successively on application of stepping signals thereto.

15. An information scanning transmission system including at one location counting means capable of being successively stepped to unique stepping conditions to scan storage devices containing items of information for transmission, the total number of counting steps of the counting means being small compared with the number of items of information to be scanned for transmission, a selector circuit, the selector circuit having means for rendering the counting means operable in response to stepping signals to gate, over a scan, successive items of information for transmission to a plurality of further locations, each further location having further counting means also responsive to stepping signals to operate in step with the first counting means to gate items of information received in said scan to appropriate registers and also having conditioning means responsive to the recognition of a received scan of items of information pertaining to the further location for initiating a scan of items of information to be transmitted to the one location, registers at the one location, and the selector circuit having means for rendering the counting means at the one location operable in the next scan to gate items of information received from one said further location to appropriate ones of the registers, the counting means at the one location comprising two counters operable in alternate scans to gate successive groups of items of information for transmission and in intervening scans to gate successive groups of items of information on reception to appropriate registers, the operation of the two counters being interleaved such that when one counter is gating items for transmission the other counter is gating items on reception to appropriate registers.

References Cited

UNITED STATES PATENTS

| | | | |
|---|---|---|---|
| 3,035,248 | 5/1962 | Grose et al. | 340—163 |
| 3,122,723 | 2/1964 | Coley et al. | 340—163 |
| 3,138,781 | 6/1964 | Horst et al. | 340—163 |
| 3,146,456 | 8/1964 | Silliman et al. | 340—163 |
| 3,244,804 | 4/1966 | Wittenberg | 340—147 X |

JOHN W. CALDWELL, *Primary Examiner.*

NEIL C. READ, THOMAS B. HABECKER,
*Examiners.*

H. I. PITTS, *Assistant Examiner.*